(12) United States Patent
Sato

(10) Patent No.: US 7,019,490 B2
(45) Date of Patent: Mar. 28, 2006

(54) BATTERY PACK WITH CASE FOR SECONDARY BATTERY

(75) Inventor: Bunya Sato, Fukushima (JP)

(73) Assignee: Sony Corporation, Tokyo (JP)

( * ) Notice: Subject to any disclaimer, the term of this patent is extended or adjusted under 35 U.S.C. 154(b) by 229 days.

(21) Appl. No.: 10/691,197

(22) Filed: Oct. 22, 2003

(65) Prior Publication Data

US 2004/0137323 A1 Jul. 15, 2004

(30) Foreign Application Priority Data

Oct. 23, 2002 (JP) ............................ P2002-308797

(51) Int. Cl.
*H01M 10/46* (2006.01)
(52) U.S. Cl. ..................................................... 320/107
(58) Field of Classification Search ................ 320/107, 320/110, 150; 429/99, 100, 185, 152
See application file for complete search history.

(56) References Cited

U.S. PATENT DOCUMENTS

| | | | |
|---|---|---|---|
| 4,963,161 A * | 10/1990 | Chi et al. ................ | 429/218.1 |
| 6,294,287 B1 * | 9/2001 | Lee et al. .................. | 429/120 |
| 6,312,849 B1 * | 11/2001 | Hall ........................... | 429/164 |
| 6,859,365 B1 * | 2/2005 | Koiwa et al. ............... | 361/687 |

* cited by examiner

*Primary Examiner*—Edward H. Tso
(74) *Attorney, Agent, or Firm*—Sonnenschein, Nath & Rosenthal LLP

(57) ABSTRACT

In a battery pack including a plurality of secondary batteries within an outer case, any one of an adhesive, a gel filler, and a flat rubber sheet having a thermal conductivity of more than 0.4 W/mK ($0.96 \times 10^{-3}$ cal/cm·sec·° C.) is provided at a gap between the plurality of secondary batteries and the outer case.

4 Claims, 9 Drawing Sheets

BATTERY PACK WITH CASE FOR SECONDARY BATTERY

CROSS REFERENCE TO RELATED APPLICATION

This application claims priority from Japanese Priority Document No. 2002-308797, filed on Oct. 23, 2002 with the Japanese Patent Office, which document is hereby incorporated by reference.

BACKGROUND OF THE INVENTION

1. Field of the Invention

This invention relates to a battery pack suitable for a mobile electronic device such as a laptop computer and the like.

2. Description of the Related Art

Generally, in a laptop computer, a battery pack which includes 6 cylindrical lithium-ion secondary batteries within a plastic outer case having flat and rectangular shaped top and bottom is employed as a power source. In the battery pack that includes 6 cylindrical lithium-ion secondary batteries within such plastic outer case having flat and rectangular shaped top and bottom, a portion where the lithium-ion secondary batteries and the outer case are directly contacted is an elongated small area, and there exists air having a worse thermal conductivity at a gap between the lithium-ion secondary batteries and the outer case.

Accordingly, even these cylindrical lithium-ion secondary batteries generate heat and become higher temperature, it is hard to transfer the heat to the outer case. Resultantly, the temperature of these lithium-ion secondary batteries tends to become higher to be over 60° C. If the temperature of these lithium-ion secondary batteries becomes about 60° C. or higher, the performance of the lithium-ion secondary batteries is tend to be deteriorated.

Further, there is such a battery case where adhesives such as adhesive called Super-X manufactured by Cemedine Co., Ltd., adhesive called SE9140 manufactured by Toray Dow Corning Silicone Co., Ltd., or the like are provided or coated between the lithium-ion secondary batteries and the outer case in order to avoid from being destroyed even when a user drops the battery pack from a height of about 1 m.

However, a thermal conductivity of these adhesives such as the Super-X, the SE9140, or the like, is from about 0.1 W/mK to 0.2 W/mK, and this means that the thermal conductivity of these adhesives is extremely worse. Therefore, even if the cylindrical lithium-ion secondary battery generates heat and becomes a higher temperature, the heat is hard to transfer to the outer case. Accordingly as described before, the temperature of the lithium-ion secondary battery goes higher, and in this case, the temperature of the lithium-ion secondary battery is likely to be higher than 60° C. If the temperature of the lithium-ion secondary battery becomes about 60° C. or higher, the performance of the lithium-ion secondary battery is tend to be deteriorated.

For example, if a user of a laptop computer or the like repeated heavy load current discharges within a high temperature atmosphere of over 35° C. by several hundreds times, the performance of the lithium-ion secondary battery was deteriorated and the discharge capacity was degraded by about 20% or more.

Conventionally, such technology is well-known that when the temperature of the lithium-ion secondary battery in case of discharge becomes a temperature T1, 60° C. for example, where the performance of the lithium-ion secondary battery is deteriorated, the discharge of the lithium-ion secondary battery is intentionally stopped, but when the discharge was intentionally stopped at this temperature T1, the discharge was to be frequently stopped, and therefore, the laptop computer frequently became inoperative, and that was very inconvenient for a user.

SUMMARY OF THE INVENTION

It is one aspect of the present invention to improve heat radiation of a secondary battery in a battery pack, and to improve the performance deterioration of the secondary battery.

Namely, in the battery pack of the present invention, a plurality of secondary batteries is housed within an outer case of the battery pack, and adhesive having a thermal conductivity of over 0.4 W/mK ($0.96 \times 10^{-3}$ cal/cm·sec·° C.) is provided at a gap between these plurality of secondary batteries and the outer case.

According to the present invention, because the adhesive having a thermal conductivity of over 0.4 W/mK ($0.96 \times 10^{-3}$ cal/cm·sec·° C.) is provided at the gap between the plurality of secondary batteries and the outer case, it is possible to radiate the heat of the plurality of secondary batteries by way of the outer case, because this adhesive has relatively a good thermal conductivity.

Further, according to the battery case of another embodiment of the present invention, a plurality of secondary batteries is housed within an outer case of the battery pack, and gel filler having a thermal conductivity of over 0.4 W/mK ($0.96 \times 10^{-3}$ cal/cm·sec·° C.) is provided at the gap between the plurality of secondary batteries and the outer case.

According to this embodiment of the present invention, because the gel filler having the thermal conductivity of over 0.4 W/mK ($0.96 \times 10^{-3}$ cal/cm·sec·° C.) is provided at the gap between the plurality of secondary batteries and the outer case, it is possible to radiate the heat of the plurality of secondary batteries by way of the outer case, because this gel filler has relatively a good thermal conductivity.

Further, according to the battery case of further another embodiment of the present invention, a plurality of secondary batteries is housed within an outer case of the battery pack, and a pressure deformable flat rubber sheet having a thermal conductivity of over 0.4 W/mK ($0.96 \times 10^{-3}$ cal/cm·sec·° C.) is provided at a gap between the plurality of secondary batteries and the outer case.

According to this embodiment of the present invention, because the pressure deformable flat rubber sheet having the thermal conductivity of over 0.4 W/mK ($0.96 \times 10^{-3}$ cal/cm·sec·° C.) is provided at the gap between the plurality of secondary batteries and the outer case, it is possible to radiate the heat of the plurality of secondary batteries by way of the outer case, because this pressure deformable flat rubber sheet has relatively a good thermal conductivity.

DETAILED DESCRIPTION OF THE PREFERRED EMBODIMENTS

Hereinafter, a first embodiment 1 of the present invention is explained with reference to FIGS. 1 to 3.

Figure 1:
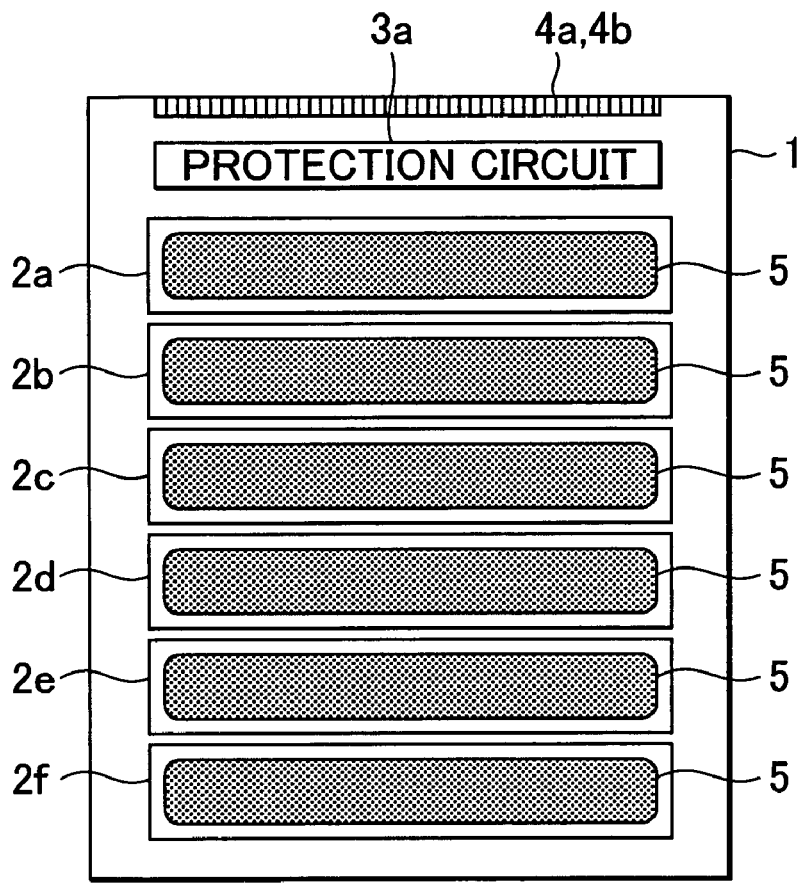
FIG. 1 is a plan view of a battery pack according to the present invention, wherein a top face is removed.
Figure 2:
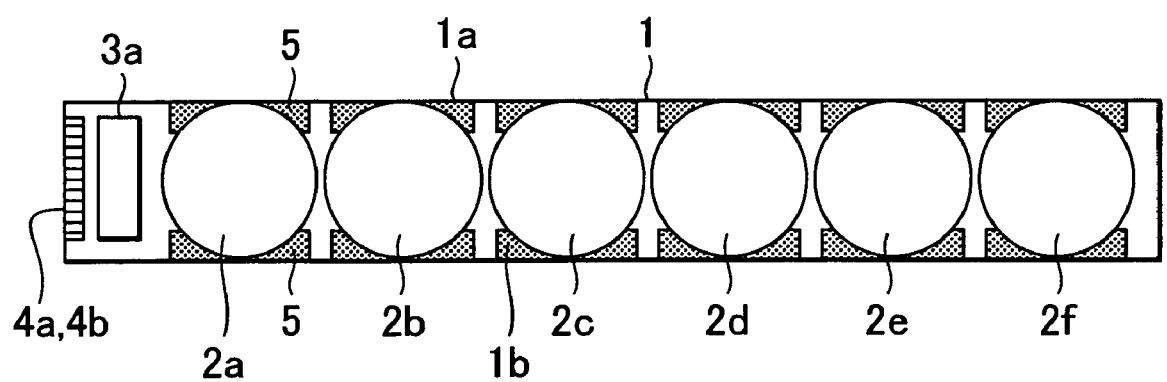
FIG. 2 is a sectional view of the battery case in FIG. 1.

In FIGS. 1 and 2, a reference numeral 1 designates a plastic outer case which has flat and rectangular shaped top face 1a and bottom face 1b, and in the outer case 1, 6 cylindrical lithium-ion secondary batteries 2a, 2b, 2c, 2d, 2e and 2f each having 18 mm in diameter and 65 mm in length and 1.8 Ah in its discharge capacity are housed.

Figure 3:
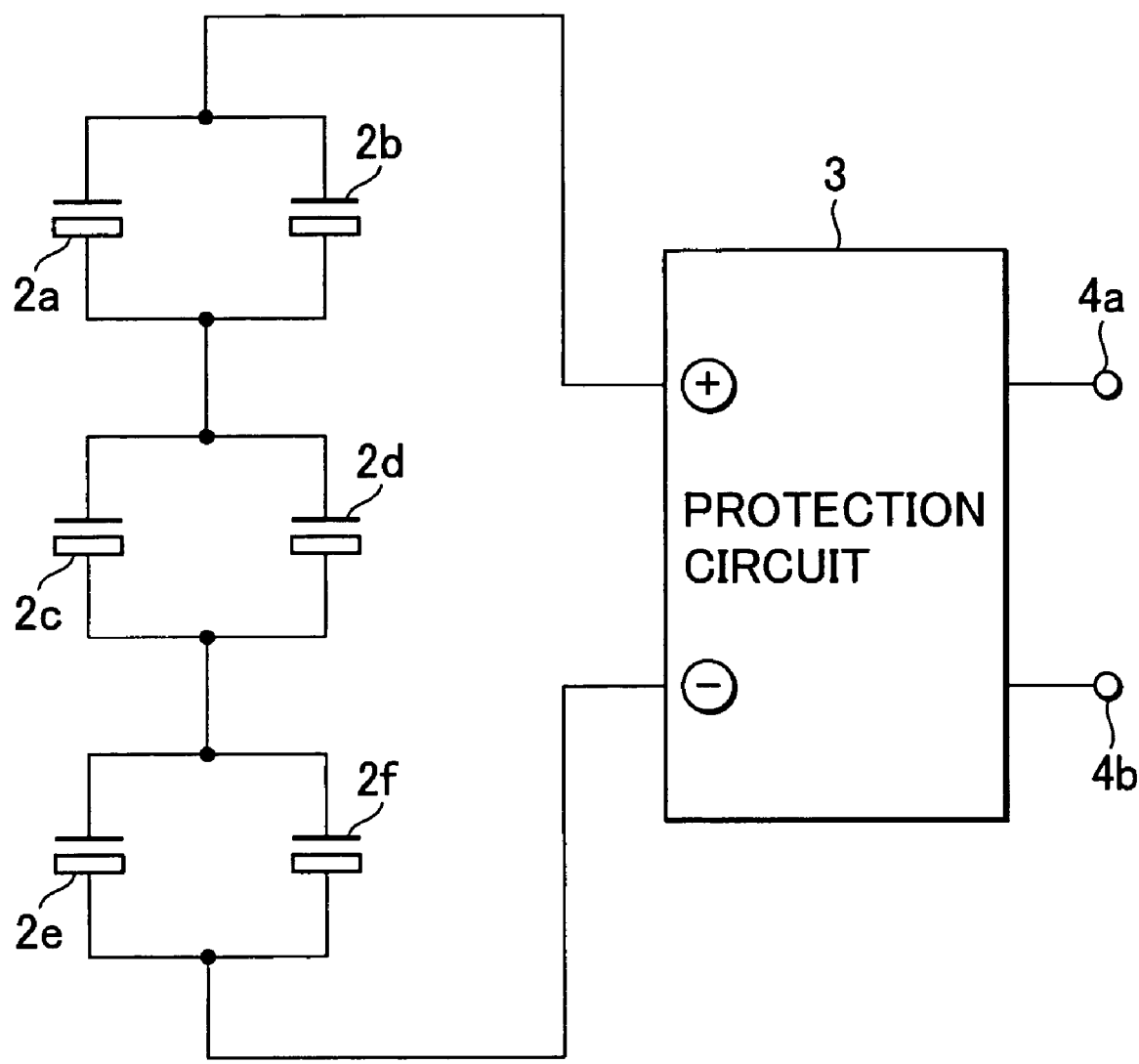
FIG. 3 is a circuit diagram of the battery pack in FIG. 1.

Every two of these 6 lithium-ion secondary batteries 2a, 2b . . . 2f are connected in parallel and three of these parallel-connected two batteries are connected in series as shown in FIG. 3. A positive electrode and a negative electrode of the series-connected batteries are connected to a protection circuit 3, and external terminals 4a, 4b are derived from the protection circuit 3. The protection circuit 3 has a protection function for preventing an excess voltage charge, an excess voltage discharge, and an excess current discharge of the lithium-ion secondary battery. Further, the protection circuit 3 is necessary to prevent a malfunction of the lithium-ion secondary battery. For example, when the lithium-ion secondary battery is charged with a voltage over 4.3 V, the protection circuit 3 cuts off the charge current.

At one side of the outer case 1, a circuit board 3a is provided, and the protection circuit 3 is mounted on the circuit board 3a. Further, the external terminals 4a, 4b are provided at one side edge of the outer case 1.

According to the present embodiment 1, an adhesive 5 having a thermal conductivity of over 0.4 W/mK ($0.96 \times 10^{-3}$ cal/cm·sec·° C.) is provided at the gap between inside of the top face 1a and the bottom face 1b of the outer case 1 and the 6 lithium-ion secondary batteries 2a, 2b . . . 2f as shown in FIGS. 1 and 2.

In this embodiment 1, an adhesive SC901 manufactured by Sony Chemicals Corp. was employed as the adhesive 5. In this adhesive SC901, its thermal conductivity is 0.4 W/mK ($0.96 \times 10^{-3}$ cal/cm·sec·° C.), its gravity is 1.65, it includes 50 Wt % of metal powder (aluminum powder), its adhesive force is 2.9 Mpa, and it is a silicon adhesive which does not show any cubical expansion when dried. Namely, the adhesive SC901 is the adhesive having a high thermal conductivity.

Such adhesive SC901 is provided at the gap between insides of respective top face 1a and the bottom face 1b of the outer case 1 of the battery pack and the 6 lithium-ion secondary batteries 2a, 2b . . . 2f as shown in FIGS. 1 and 2 by about 1 gram per one lithium-ion secondary battery, namely by about 6 grams in total.

Figure 4:
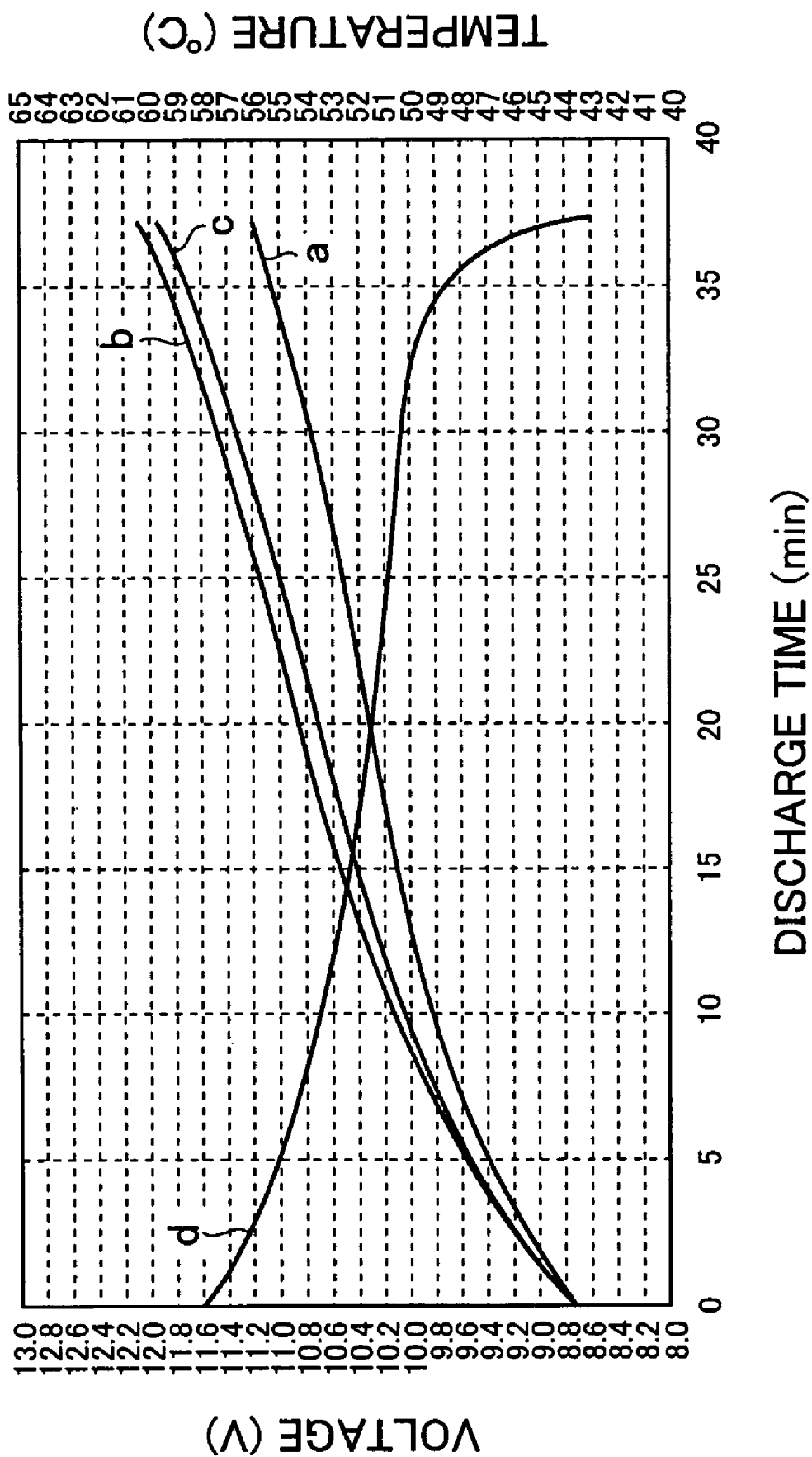
FIG. 4 is a graph for explaining the present invention.

When a heavy load current discharge of 5.8 A is carried out at the battery pack of the above embodiment 1 under the atmospheric temperature of 45° C. which is an ambient temperature of the battery pack, the temperature of the lithium-ion secondary batteries 2a, 2b . . . 2f gradually increases as shown by a curve a in FIG. 4, but the temperature of the lithium-ion secondary batteries 2a, 2b . . . 2f at the end of the discharge is about 57.6° C., and this is blow 60° C. In FIG. 4, a curve d shows a terminal voltage between the terminals 4a and 4b of the battery pack of the present embodiment 1.

Figure 10:
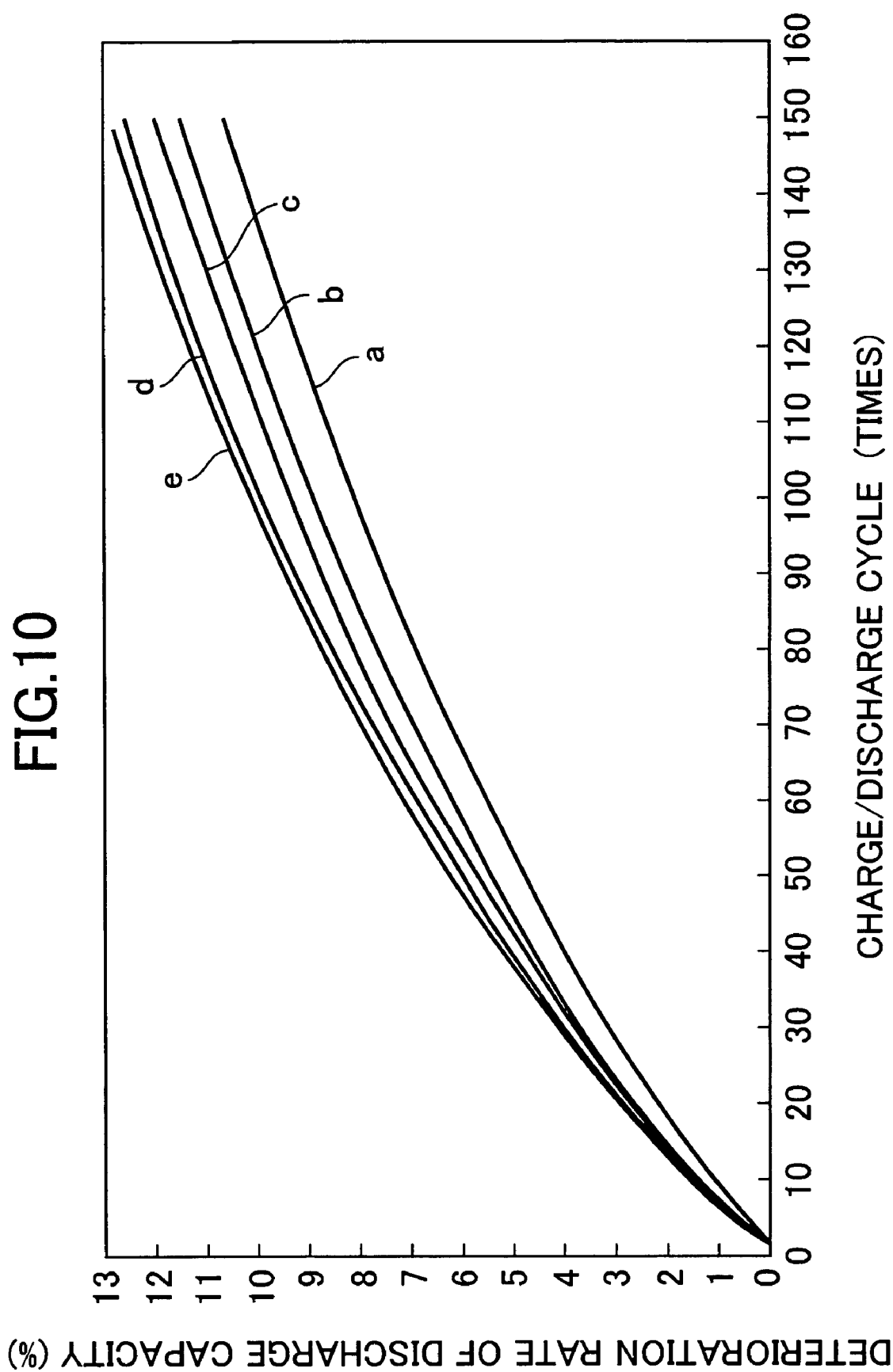
FIG. 10 is a graph showing charge/discharge characteristics (discharge capacity deterioration rate) of from 1 to 150 cycles of the battery pack.

When the charge/discharge as mentioned above is repeated at by about 150 times in the battery pack of the present embodiment 1, the deterioration ratio in the charge current capacity of the battery pack becomes about 10.6% as shown in the curve a in FIG. 10, and the deterioration of the performance is thus improved. In this case, the charge/discharge cycle is carried out with 5 A in charge current and 12.6 V in charge voltage.

In the conventional battery pack where the adhesive Super-X having the thermal conductivity of about 0.2 W/mK ($0.48 \times 10^{-3}$ cal/cm·sec·° C.) is provided to the battery pack as shown in FIGS. 1 and 2 by coating, and by 1 gram per each of the lithium-ion secondary batteries 2a, 2b . . . 2f, namely by 6 grams in total to the battery pack in order to avoid breakage of the battery pack when a user drops the battery pack from about 1 m in height, when a heavy load current discharge of 5.8 A is carried out under the ambient temperature of 45° C., the temperature of the lithium-ion secondary batteries 2a, 2b . . . 2f gradually increases as shown by a curve b in FIG. 4, and the temperature of the lithium-ion secondary batteries 2a, 2b . . . 2f at the end of the discharge becomes about 61.6° C.

In the conventional battery pack as mentioned above, when the charge/discharge as mentioned is carried out by about 150 times, the deterioration rate of the charge current capacity becomes 12.6% as show by a curve d in FIG. 10.

Further in this embodiment 1, the adhesive SC901 has also an effect of adhesion, and of course the lithium-ion secondary batteries 2a, 2b . . . 2f and the outer case 1 are tightly fixed in order to avoid its breakage when a user drops the battery pack from 1 m in height.

The adhesive is preferably coated by an amount depending on the size of the battery pack. In this case, the reason why the amount of coating of the adhesive SC901 is set to be 1 grams per each of lithium-ion secondary batteries, namely 6 grams in total is that even if the amount of coating is increased over 6 grams, it is not so effective for decreasing the temperature of the lithium-ion secondary battery at the end of the discharge. Further, this adhesive SC901 is relatively expensive, and it becomes cost-down to suppress the use amount of coating to a minimum amount. Further, when the amount of coating is an excess amount, defects such as an overflow of the adhesive to outside of the outer case 1 and an improper height in an outer size of the outer case 1 are tend to be occurred when manufacturing.

Figure 5:
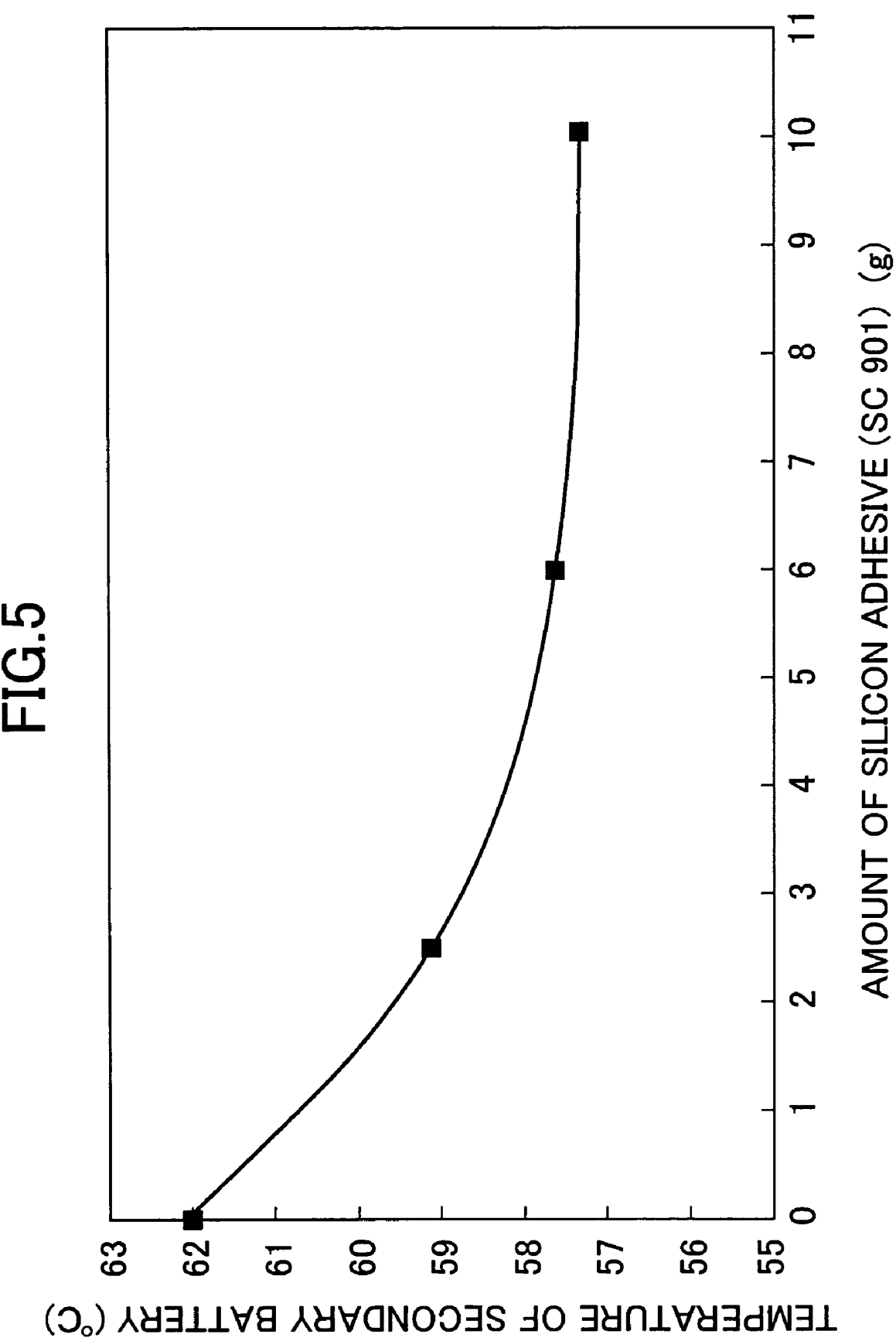
FIG. 5 is a graph for explaining the present invention.

FIG. 5 is a graph showing a maximum temperature of the secondary battery cell at the end of the discharge which is carried out with a heavy load current of 5.8 A within an atmospheric temperature of 45° C., where the amount of coating of the adhesive SC901 is changed to 0 g, 2.5 g, 6 g, and 10 g. From this graph in FIG. 5, it is understand that even the amount of coating of the adhesive SC901 is increased over 6 grams, the improvement in an effect of suppressing temperature rise is small.

In an embodiment 2, an adhesive having a thermal conductivity of 0.4 W/mK ($0.96 \times 10^{-3}$ cal/cm·sec·° C.) is used as the adhesive 5. As the adhesive having the thermal conductivity of 0.4 W/mK ($0.96 \times 10^{-3}$ cal/cm·sec·° C.), such adhesive is proper adhesive that is made of 20 wt % of metal powder (aluminum powder) and 80 wt % of silicon, shows an adhesive force of over 2 Mpa, and does not show any cubical expansion when dried.

Such adhesive having the thermal conductivity of 0.4 W/mK ($0.96 \times 10^{-3}$ cal/cm·sec·° C.) is provided at the gap between insides of respective top face 1a and the bottom face 1b of the outer case 1 of the battery pack and the 6 lithium-ion secondary batteries 2a, 2b . . . 2f as shown in FIGS. 1 and 2 by about 1 gram per one lithium-ion secondary battery, namely by about 6 grams in total.

When the discharge of a heavy load current 5.8 A at an atmospheric temperature 45° C. which is an the ambient temperature of the above mentioned battery pack of the embodiment 2 is carried out, the temperature of the lithium-ion secondary batteries 2a, 2b . . . 2f increases gradually as shown by a curve c in FIG. 4, but the temperature of the lithium-ion secondary batteries 2a, 2b . . . 2f at the end of the discharge was below 60° C.

Accordingly, in the battery pack of the embodiment 2, the heat radiation of the lithium-ion secondary batteries 2a, 2b . . . 2f is better, and the deterioration of the charge current capacity is to be improved.

In the conventional battery pack as mentioned above, when the charge/discharge as mentioned above is carried out by about 150 times, the deterioration rate of the charge current capacity becomes 12.0% as show by a curve c in FIG. 10.

Figure 6:
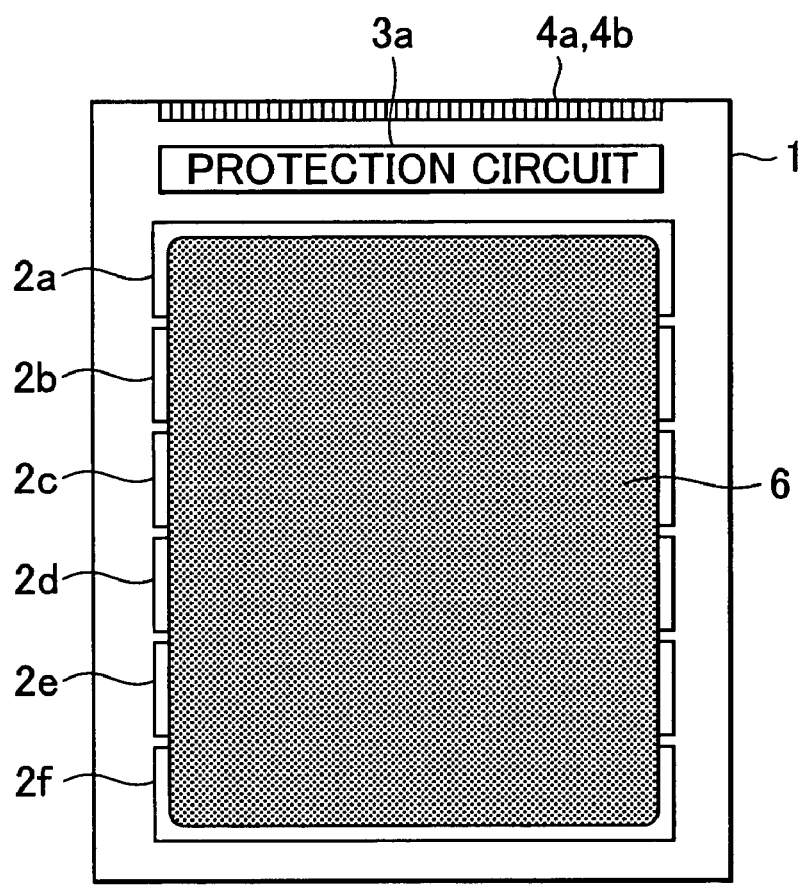
FIG. 6 is a plan view of a battery pack according to another embodiment of the present invention, wherein a top face is removed.
Figure 7:
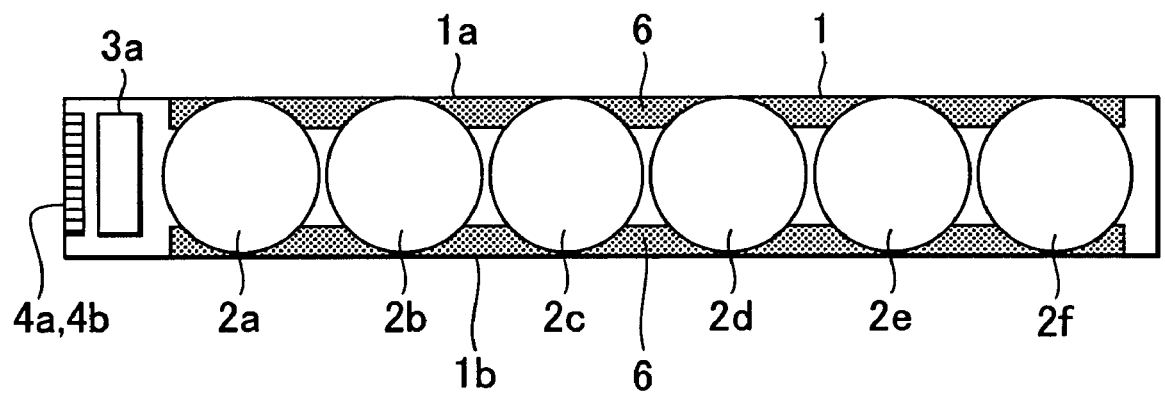
FIG. 7 is a sectional view of the battery case in FIG. 6.

Further, a gel sheet of 6 g made of the thermal radiation silicon gel SE4440 manufactured by Toray Dow Corning Silicone Co., Ltd. is provided at the gap between insides of respective top face 1a and the bottom face 1b of the outer case 1 of the battery pack and the 6 lithium-ion secondary batteries 2a, 2b . . . 2f as shown in FIGS. 6 and 7. In this case, when the charge/discharge as mentioned above is carried out by about 150 times, the deterioration rate of the charge current capacity becomes 11.4% as show by a curve b in FIG. 10.

In the conventional battery pack to which any adhesive is not employed, when the charge/discharge as mentioned above is carried out by about 150 times, the deterioration rate of the charge current capacity becomes 12.8% as show by a curve e in FIG. 10.

Further, as the adhesive 5, the adhesive SE4486 having further higher thermal conductivity and manufactured by Toray Dow Corning Silicone Co. Ltd. may be used. The thermal conductivity of the adhesive SE4486 is 1.59 W/mK ($3.8 \times 10^{-3}$ cal/cm·sec·° C.). In this case, the heat radiation of the lithium-ion secondary battery is further improved.

Further, a thermal conductive two-sided tape may be used instead of the adhesive 5. As the thermal conductive two-sided tape, the thermal conductive two-sided tape No.7090 manufactured by Teraoka Seisakusho Co., Ltd. can be used. The thermal conductivity of the thermal conductive two-sided tape No.7090 is $1.0 \times 10^{-3}$ cal/cm·sec·° C.

According to the above mentioned embodiment, as the adhesive 5 having the thermal conductivity of more than 0.4 W/mK ($0.96 \times 10^{-3}$ cal/cm·sec·° C.), the two-sided tape No.7090 is provided at the gap between the 6 lithium-ion secondary batteries 2a, 2b . . . 2f and the insides of respective top face 1a and the bottom face 1b of the outer case 1 of the battery pack, so that it is possible to radiate the heat of the 6 lithium-ion secondary batteries 2a, 2b . . . 2f through the outer case 1, to suppress the increase of the temperature of the lithium-ion secondary batteries 2a, 2b . . . 2f at a higher atmospheric temperature upon carrying out a large current charge, and to prevent the deterioration of the battery capacity when repeatedly used, because the adhesive 5, namely the two-sided tape No.7090 relatively has a better thermal conductivity.

Figure 11:
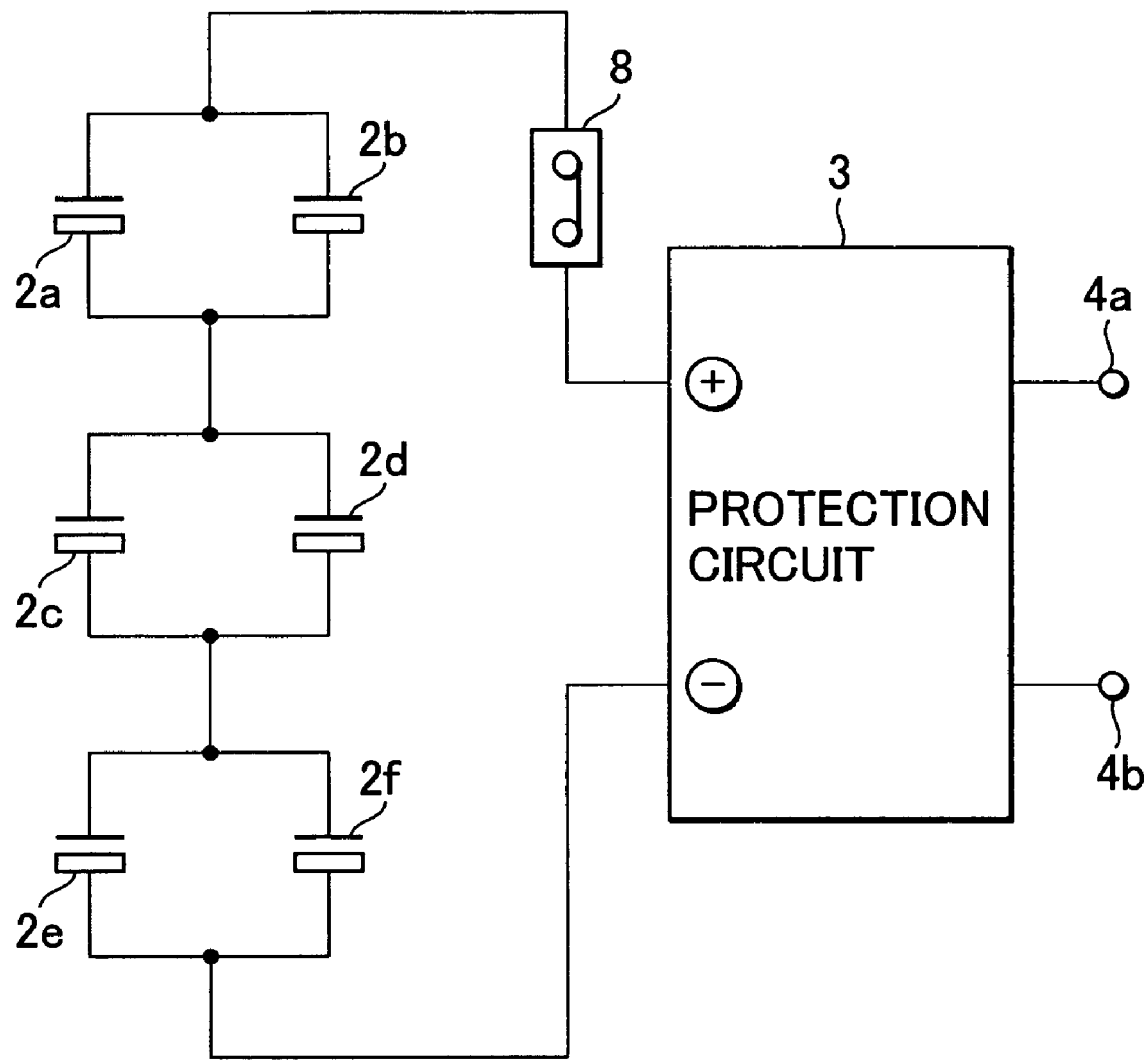
FIG. 11 is a circuit diagram of the battery pack having a thermostat.

Now, a case where the present invention is applied to a battery pack having a built-in thermostat which functions to shut down the discharge current when the battery cell temperature exceeds a predetermined temperature. A circuit diagram of such battery pack having the built-in thermostat is shown in FIG. 11. The thermostat 8 is connected in series to the combined battery cells.

The thermostat 8 is attached to the secondary battery cells and is arranged so that the cell temperature of the secondary battery and the temperature of the thermostat 8 becomes equal. When the temperature of the secondary battery cells increases and becomes the operating temperature 70° C. of the thermostat 8 during the discharge, then, the switch of the thermostat 8 is made open to shut down the discharge current. The operation temperature of the thermostat 8 is generally 70° C. or 80° C. The thermostat 8 is installed in order to shut down the discharge current or charge current to avoid a dangerous condition when the secondary battery cells become an abnormally high temperature.

According to the present embodiment, in case the present invention is applied to the battery pack having a built-in thermostat where the discharge current is shut down when the battery cell temperature exceeds a predetermined temperature, it is possible to reduce the temperature rise of the secondary battery cell, so that the temperature does not reach the operating temperature of the thermostat where the thermostat opens the charge circuit, and it is possible to make larger the continuous operating discharge current.

Figure 12:
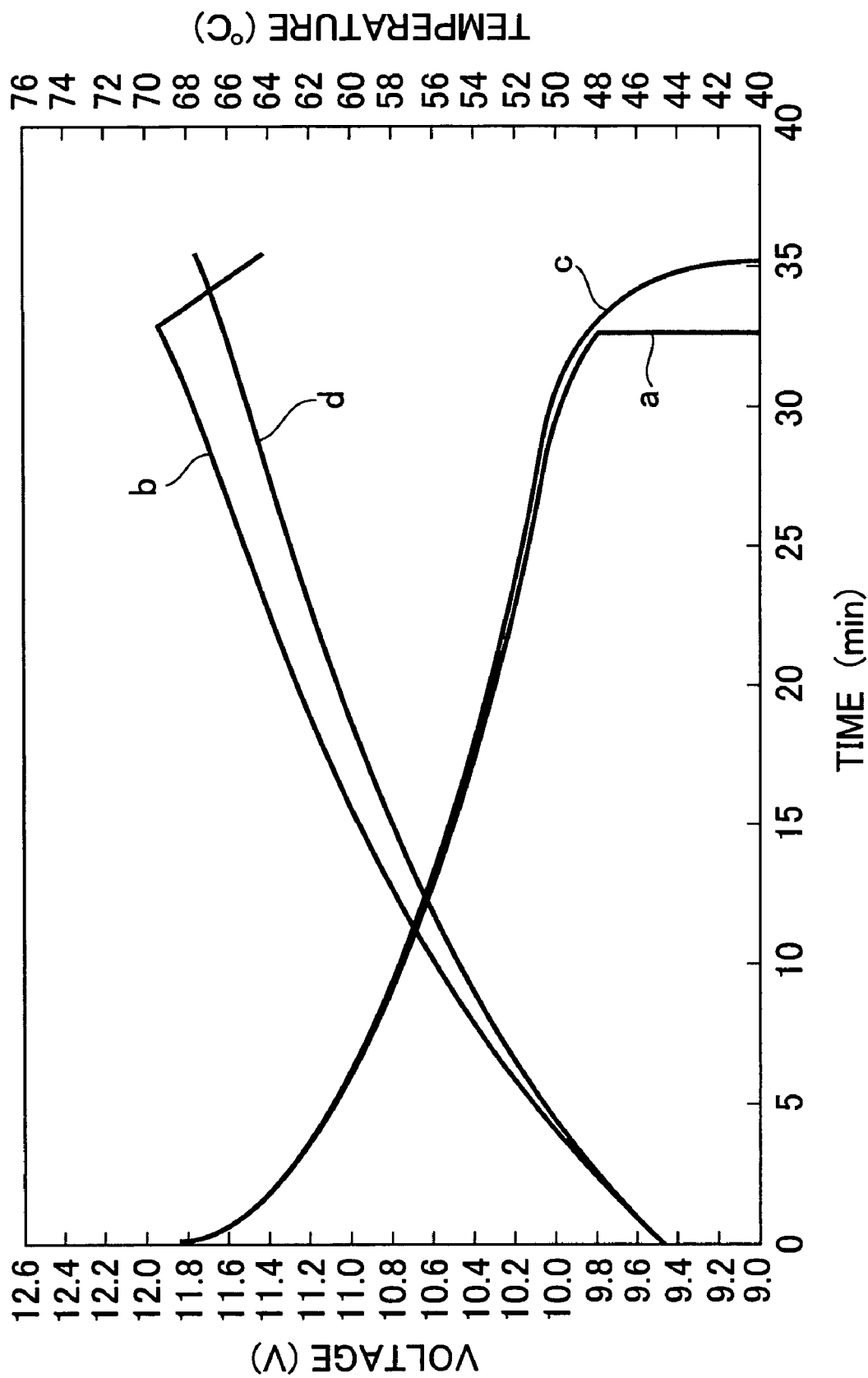
FIG. 12 is a graph showing a discharge characteristic of the battery pack discharging at 6 A.

Discharge characteristics of 6 A discharge at the atmospheric temperature of 45° C. for both the battery pack to witch the present invention is applied and the one to which the present invention is not applied are shown in FIG. 12. In the battery pack used in the experiment of this time, the outer case had a larger outer size than that of the battery pack used in the above mentioned 5.8 A discharge, so that the radiation of the heat was relatively bad.

In the battery pack to which the present embodiment is not applied, the adhesive Super-X was coated on all of the secondary battery cells. In this case, the adhesive Super-X was coated by 1 gram between each one of secondary battery cells and the outer case 1.

The external terminal voltage of the battery pack to which the present invention is not applied is depicted by a curve a, and a secondary battery cell temperature in the vicinity of the thermostat is depicted by a curve b in FIG. 12.

In the battery pack to which the present invention was not applied, the secondary battery cell temperature reached 69° C. during the discharge, and the thermostat shut down the discharge current. The shut down operation temperature of the thermostat in this battery pack was 69° C.

Accordingly, it is necessary to set the actual maximum discharge current of the battery pack to which the present invention is not applied to a value smaller than 6 A. It means that the load for the battery pack should be reduced.

In the battery pack to which the present invention was applied, the adhesive SC901 was coated to all of secondary battery cells. Between one of the secondary battery cells and the outer case, the adhesive SC901 was coated by 1 gram.

An external terminal voltage of the battery pack to which the present embodiment is applied is depicted by a curve c, and a temperature of the secondary battery cell in the vicinity of the thermostat is depicted by a curve d in FIG. 12.

In the battery pack to which the present embodiment was applied, the thermostat was not operated because the temperature of the secondary battery cells was below 67° C., and the charge was carried out normally to the end. In the battery pack to which the present embodiment is applied, an effective maximum discharge current can be set to 6 A.

Namely, according to the present invention, it is possible to discharge the battery pack with a larger current. Recently, as the CPU performance installed in the laptop computer becomes higher, the power consumption by the CPU becomes larger. Accordingly, the discharge current required to a battery pack becomes larger from 6A to 10 A. Namely, by applying the present invention, a battery pack bearable to such heavy load discharge current can be easily realized.

Also in the above mentioned embodiment, as the adhesive 5 is provided between the outer case 1 and the lithium-ion secondary batteries, the lithium-ion secondary batteries 2a, 2b . . . 2f and the outer case 1 are tightly fixed by the adhesive effect of the adhesive 5 so that the battery pack does not break when a user drops the battery case from 1 m in height.

In an electronic device such as a laptop computer to which the present invention is employed, when the battery pack is positioned at a bottom part of a body of the laptop computer, and when the body of the laptop computer generates heat, the heat having higher temperature of the body side is transferred from the top face 1*a* of the outer case 1 of this battery pack→the adhesive 5→the lithium-ion secondary batteries 2*a*, 2*b* . . . 2*f*→the adhesive 5 to the bottom face 1*b* of the outer case 1, and then the heat is radiated to an external desk or the like.

Accordingly, when the body of the laptop computer becomes high temperature by the generation of heat, the radiating heat amount from the battery pack is also relatively large, so that it is possible to suppress the temperature rise to be lower. As a result, it becomes possible to prevent the deterioration of electronic parts and to extend the life of the electronic parts such as electrolytic capacitor.

Further another embodiment of the present invention is shown in FIGS. 6 and 7. When the embodiment in FIGS. 6 and 7 is explained, portions corresponding to the portions in FIGS. 1 and 2 are referenced with the same reference numerals and their explanation is omitted.

In the embodiment in FIGS. 6 and 7, a gel filler 6 having a thermal conductivity of more than 0.4 W/mK ($0.96 \times 10^{-3}$ cal/cm·sec·°C.) is provided at a gap between inside of the top face 1*a* and the bottom face 1*b* of the outer case 1 and the 6 lithium-ion secondary batteries 2*a*, 2*b* . . . 2*f*. Others are arranged similar to FIGS. 1 and 2.

As the gel filler 6, a thermal radiation silicon gel SE4440 manufactured by Toray Dow Corning Silicone Co., Ltd. can be used. The thermal conductivity of this thermal radiation silicon gel SE4440 is 0.83 W/mK ($2.0 \times 10^{-3}$ cal/cm·sec °C.).

Further, the gel filler 6 may be replaced by a flat gel sheet. The flat gel sheet 6 has a gel function of easily deformed by pressure. In case of using the flat gel sheet, the flat gel sheet is easily deformed by a small pressure, so that such flat gel sheet having a relatively large thickness is able to be packed, and a surface area of the cylindrical lithium-ion secondary batteries to which the gel sheet contacts becomes large. Accordingly, a heat radiation amount from the lithium-ion secondary batteries to the outer case 1 becomes larger, and it is possible to decrease the temperature rise of the battery pack.

For example a gel sheet having a thickness of about 1 mm to 3 mm is able to be installed in the battery pack. In case of using such flat gel sheet, it is possible for the weight of the filler installed upon manufacturing to be a constant. Accordingly, the radiation characteristic of the battery pack can be a constant to suppress the fluctuation thereof.

Further in case of using the flat gel sheet, there is no fear such that the filler is attached to parts such as the outer case and causes the defect upon manufacturing. It is easily understand that also in the embodiment in FIGS. 6 and 7, the same effect as shown in the embodiment in FIGS. 1 and 2 is expected.

In addition, this gel filler 6 or the gel sheet has an elasticity, so that, there is an advantage in preventing the damage of the battery pack when it is dropped. This gel sheet is easily deformed when the battery pack is dropped, so that it is possible to absorb its shock.

Figure 8:
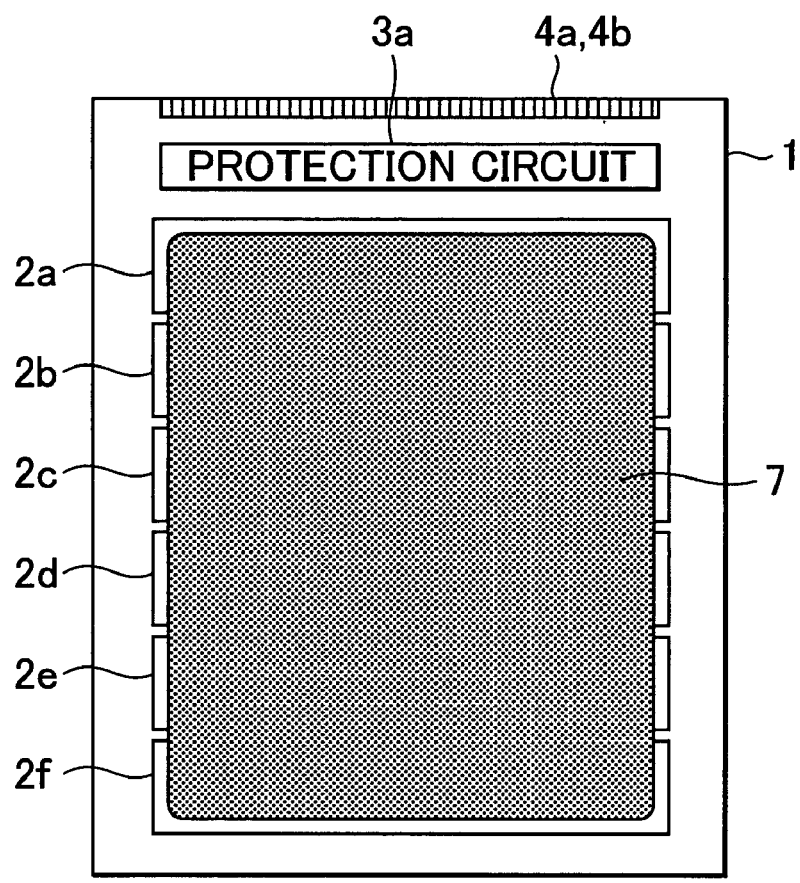
FIG. 8 is a plan view of a battery pack according to further another embodiment of the present invention, wherein a top face is removed.
Figure 9:
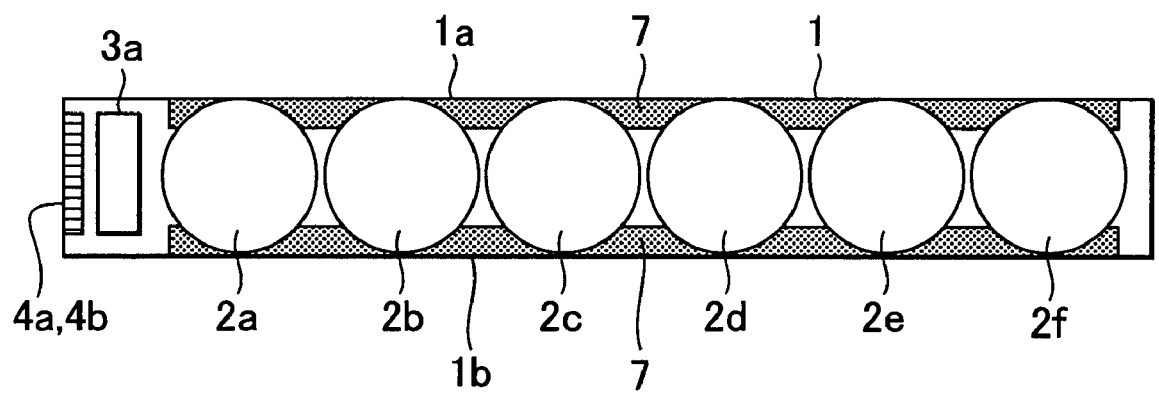
FIG. 9 is a sectional view of the battery case in FIG. 8.

Further, FIGS. 8 and 9 show further another embodiment of the present invention. In these FIGS. 8 and 9, the same reference numerals are applied to pats corresponding to the parts in FIGS. 1 and 2, and their detailed explanation is omitted here.

In the embodiment in FIGS. 8 and 9, a pressure deformable flat rubber sheet 7 having a thermal conductivity of over 0.4 W/mK ($0.96 \times 10^{-3}$ cal/cm·sec·°C.) is provided at the gap between inside of the top face 1*a* and the bottom face 1*b* of the outer case 1 and the 6 lithium-ion secondary batteries 2*a*, 2*b* . . . 2*f*. The other portions are configured the same as depicted in FIGS. 1 and 2.

As the rubber sheet 7, a heat conductive silicon rubber sheet manufactured by Teraoka Seisakusho Co., Ltd. can be used. The thermal conductivity of this heat conductive silicon rubber sheet is 2.0 W/mK and a tensile force is 3.7 Mpa.

Also in the embodiment in FIGS. 8 and 9, it is easily understood that the same effect is obtained as the embodiment in FIGS. 1 and 2. Further the rubber sheet 7 has an elasticity, so that it is able to protect from being damaged when the battery pack is dropped.

In the embodiments as above described, the lithium-ion secondary batteries 2*a*, 2*b* . . . 2*f* are employed as the embodiment, but of course, the other type secondary battery such as a polymer type secondary battery or the like may be used, instead. The secondary battery may be a nickel hydride secondary battery. Generally, in the nickel hydride secondary battery, the performance deterioration of the battery cell at a temperature of 60° C. is larger than that of the lithium-ion secondary battery.

Accordingly, when the nickel hydride secondary battery is applied to the present invention, it is expected that the similar prevention effect of the performance deterioration is larger. Further in the above embodiments, the shape of the secondary battery is a cylindrical shape, but it may be a rectangular shape or the like. Further, the present invention is not limited to the above mentioned embodiments, and various modifications can be possible.

What is claimed is:

1. A battery pack including a plurality of secondary batteries within an outer case comprising:

an adhesive having a thermal conductivity of more than 0.4 W/mK ($0.96 \times 10^{-3}$ cal/cm·sec·°C.) is provided at a gap between said plurality of secondary batteries and said outer case and including metal powder of more than 20 wt %.

2. A battery pack including a plurality of secondary batteries within an outer case comprising:

a gel filler having a thermal conductivity of more than 0.4 W/mK ($0.96 \times 10^{-3}$ cal/cm·sec·°C.) is provided at a gap between said plurality of secondary batteries and said outer case.

3. A battery pack including a plurality of secondary batteries within an outer case comprising:

a gel sheet having pressure deformable gel function and having a thermal conductivity of more than 0.4 W/mK ($0.96 \times 10^{-3}$ cal/cm·sec·°C.) is provided at a gap between said plurality of secondary batteries and said outer case.

4. A battery pack including a plurality of secondary batteries within an outer case comprising:

a pressure deformable flat rubber sheet having a thermal conductivity of more than 0.4 W/mK (0.96($10^{-3}$ cal/cm·sec·°C.) is provided at a gap between said plurality of secondary batteries and said outer case.

\* \* \* \* \*